United States Patent [19]

Ohsawa et al.

[11] Patent Number: 5,124,811

[45] Date of Patent: Jun. 23, 1992

[54] IMAGE ENCODING APPARATUS

[75] Inventors: Hidefumi Ohsawa, Kawaguchi; Yasuhiko Yasuda, Masashino; Shigeo Kato, Saitama, all of Japan

[73] Assignee: Canon Kabushiki Kaisha, Tokyo, Japan

[21] Appl. No.: 398,665

[22] Filed: Aug. 25, 1989

[30] Foreign Application Priority Data

Aug. 30, 1988 [JP] Japan .................. 63-217216

[51] Int. Cl.$^5$ .............................. H04N 1/40
[52] U.S. Cl. .................. 358/448; 358/426; 358/443
[58] Field of Search ............ 358/426, 261.1, 427, 358/448, 455, 466, 400, 261.2, 261.3, 429, 432, 443, 445, 447, 133, 138; 382/50, 54, 56

[56] References Cited

U.S. PATENT DOCUMENTS

| | | | |
|---|---|---|---|
| 4,229,768 | 10/1980 | Kurahayashi et al. | 358/448 |
| 4,682,869 | 7/1987 | Itoh et al. | 358/426 |
| 4,703,363 | 10/1987 | Kitamura | 358/448 |
| 4,742,399 | 5/1988 | Kitamura | 358/448 |
| 4,876,610 | 10/1989 | Ohsawa et al. | 358/443 |
| 4,878,125 | 10/1989 | Katayama et al. | 358/443 |
| 4,969,204 | 11/1990 | Melnychuck et al. | 358/426 |
| 5,050,230 | 9/1991 | Jones et al. | 358/262.1 |

FOREIGN PATENT DOCUMENTS

| | | |
|---|---|---|
| 0241989 | 10/1987 | European Pat. Off. |
| 0325373 | 7/1989 | European Pat. Off. |
| 2172172 | 9/1986 | United Kingdom |

OTHER PUBLICATIONS

"Efficient Facsimile Signal Data Reduction By Using A Thinning Process", NTC '77 Conference Record, vol. 3, 1977, Usubuchi et al., pp. 49:2-1-49:2-6.

"Step By Step Image Transmission and Display From Gross To Fine Information Using Hierarchical Coding", Transactions of IECE of Japan, vol. E63-B, No. 4, Apr. 1980, Yasuda et al., pp. 305-306.

Primary Examiner—Edward L. Coles, Sr.
Assistant Examiner—Thomas D. Lee
Attorney, Agent, or Firm—Fitzpatrick, Cella, Harper & Scinto

[57] ABSTRACT

An image encoding apparatus includes a smoothing circuit for smoothing a binary image to be encoded, a binary-encoding circuit for binary-encoding the image smoothed by the smoothing circuit, a sampling circuit for sub-sampling the image binary-encoded by the binary-encoding circuit, and an encoding circuit for encoding the binary image sub-sampled by the sampling circuit. A degree of smoothness of an image by the smoothing circuit and a threshold value for a binary-encoding operation of the binary-encoding circuit can be varied.

11 Claims, 6 Drawing Sheets

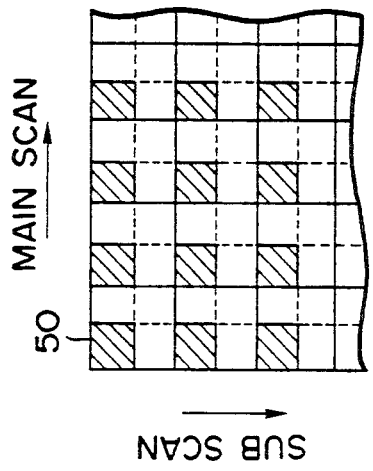
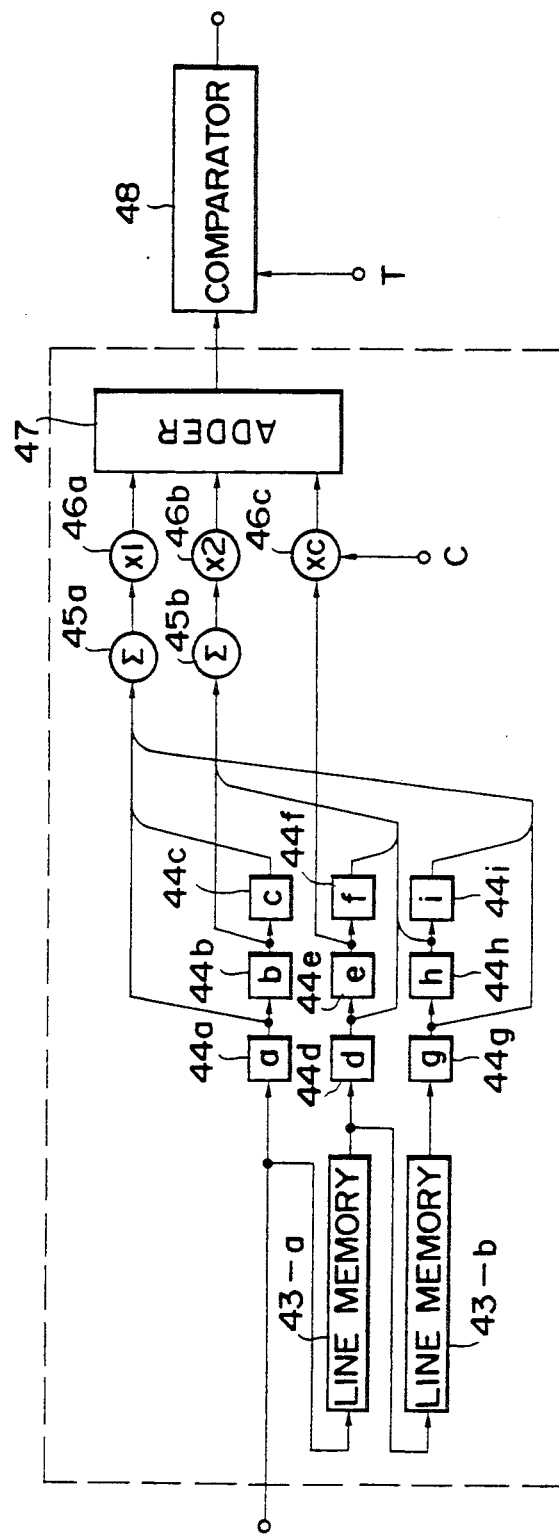
FIG.3
FIG.4
FIG.5

IMAGE ENCODING APPARATUS

BACKGROUND OF THE INVENTION

1. Field of the Invention

The present invention relates to an image encoding apparatus for encoding a binary image.

2. Related Background Art

In a facsimile apparatus as a typical still image communication apparatus, a method of encoding an image in accordance with MH or MR coding by sequentially scanning the image is employed. In this method, in order to recognize the entire image, all the image data must be transmitted, resulting in a long transmission time. Therefore, it is difficult to apply this method to an image communication service such as an image data base service, a videotex, or the like, in which an image must be quickly judged.

Unlike the method employed in the facsimile apparatus, a sequential reproducing/encoding method in which rough image data is transmitted before the entire image is transmitted, and additional data is then transmitted to generate detailed image data is proposed in, e.g., "Sequential Reproducing/Encoding Method of Facsimile Signal Suitable for Conversation Type Image Communication", Endo and Yamazaki, (Transaction of the institute of electronics, information and communication engineers, (B) J67-B.12, pp. 1462-1469 (1984)).

In a so-called progressive encoding method for generating images having different resolutions and separately encoding and transmitting the images having the different resolutions, in order to obtain a low-resolution image, an input image is subjected to sampling processing at a predetermined rate.

However, since initial image data is generated by sampling pixels at specific intervals, encoding efficiency of a normal document image is good while effective image data cannot be transmitted in a first stage depending on the type of image.

Especially, if an image which is dither-processed for pseudo halftone reproduction is simply sampled, an image is omitted depending on a sampling period. When an encoded image is reproduced, an original image cannot be faithfully reproduced.

SUMMARY OF THE INVENTION

The present invention has been made in consideration of the above situation, and has as its object to provide an image encoding apparatus which can faithfully reproduce an original image.

It is another object of the present invention to provide an image encoding apparatus which can satisfactorily form images having different resolutions in progressive coding.

It is still another object of the present invention to provide an image encoding apparatus which can satisfactorily encode images having different resolutions in progressive coding.

The above and other objects and effects of the present invention will be apparent from the following description.

BRIEF DESCRIPTION OF THE DRAWINGS

FIG. 3 is a table showing coefficients of a low-pass filter;

FIG. 4 is a block diagram of an embodiment of a low-pass filter;

FIG. 5 is a view for explaining a sub-sampling operation;

DETAILED DESCRIPTION OF THE PREFERRED EMBODIMENT

Figure 1:
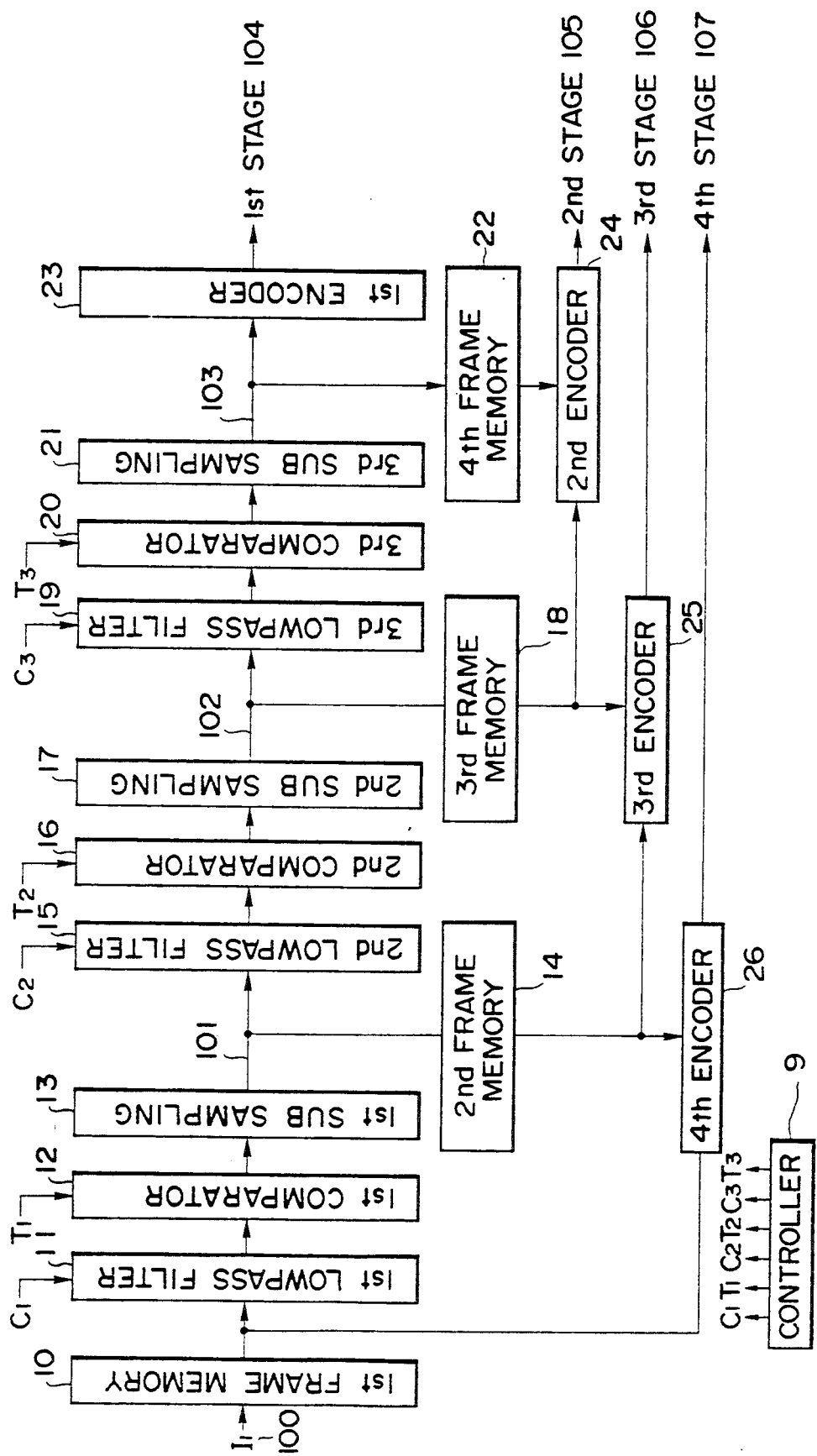
FIG. 1 is a block diagram of an embodiment of an encoder.

FIG. 1 shows an embodiment of an encoder to which the present invention is applied.

Original image data $I_1$ as binary data representing black/white of each pixel of an original image is stored in a first frame memory 10. A first low-pass filter 11 then performs smoothing processing of the image data. The smoothed data is binary-encoded again by a first comparator 12. A parameter $C_1$ for adjusting a degree of smoothing is input to the first low-pass filter 11. A threshold value $T_1$ is input to the first comparator 12. The parameters for adjusting degree of smoothness and the threshold values are set using controller 9 to provide the desired image quality and encoding efficiency. A first sub sampling 13 generates a signal 101 representing an image which is sampled to $\frac{1}{2}$ in both the vertical and horizontal directions. The signal 101 is stored in a second frame memory 14.

The signal 101 is similarly processed by a second low-pass filter 15, a second comparator 16, and a second sub sampling 17, thus generating a signal 102 representing a $\frac{1}{4}$ image. The signal 102 is stored in a third frame memory 18. The signal 102 is similarly processed by a third low-pass filter 19, third comparator 20, and a third sub sampling 21 to obtain a signal 103 representing an $\frac{1}{8}$ image. The signal 103 is stored in a fourth frame memory 22. The controller 9 inputs parameters $C_2$ and $C_3$ to the second and third low-pass filters, and threshold values $T_2$ and $T_3$ to the second and third comparators, respectively.

The signal 103 is encoded by a first encoder 23, and is transmitted as a first-stage signal 104.

A second encoder 24 performs encoding with reference to data in the fourth and third frame memories 22 and 18, and transmits a second-stage signal 105. Similarly, a third encoder 25 performs encoding with reference to data in the third and second frame memories 18 and 14, and transmits a third-stage signal 106. Similarly, a fourth encoder 26 performs encoding with reference to the second and first frame memories 14 and 10, and transmits a fourth-stage signal 107. As described above, the first to fourth encoders encode image data having different resolutions.

The image data of the first to fourth stages are encoded and transmitted in the order starting from one having a low resolution, so that a reception side can immediately identify the entire image before image data having higher resolutions are transmitted. If the data is unnecessary, transmission of image data of the higher resolutions can be stopped. Thus, a communication time of unnecessary data can be reduced, and an efficient image communication service can be provided.

In this embodiment, an image is encoded in four stages having different resolutions. However, the present invention is not limited to this, and the number of stages of encoding may be increased/decreased.

The low-pass filters, comparators, sub samplings, and encoders need not be arranged in units of stages, and a system of these components may be time-divisionally utilized in units of stages.

Figure 2:
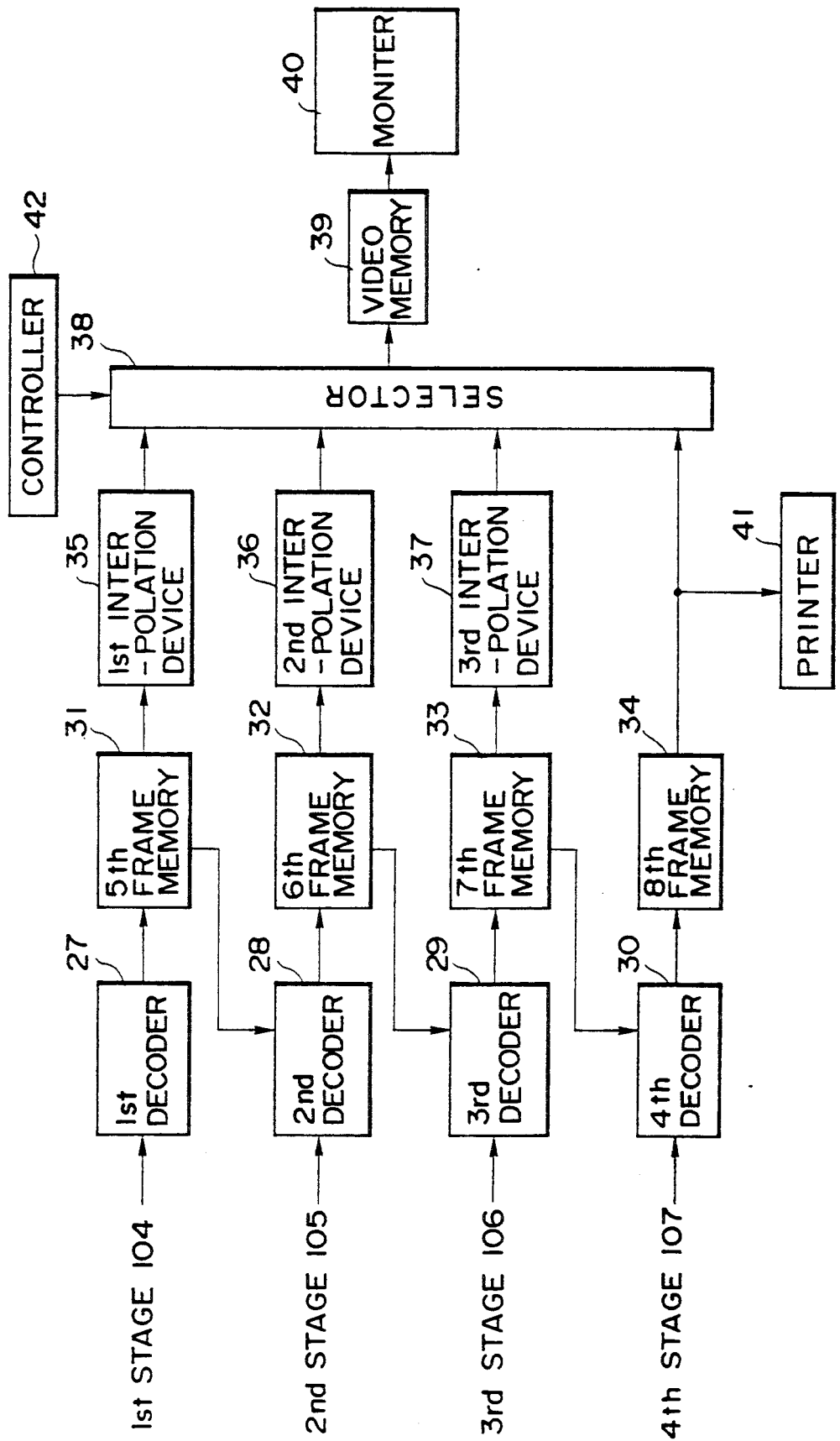
FIG. 2 is a block diagram of an embodiment of a decoder.

FIG. 2 shows an embodiment of a decoder for decoding image data encoded by the encoder shown in FIG. 1.

The first-stage signal 104 encoded based on an $\frac{1}{8}$ image by the first encoder 23 decoded by a first decoder 27, and the decoded signal is stored in a fifth frame memory 31. This signal is converted to high-resolution data by x 8 interpolation processing of a first interpolation device 35, and the high-resolution data is then stored in a video memory 39 through a selector 38 which is switched by a controller 42. The video memory 39 comprises a 2-port memory which can perform parallel input/output operations. Therefore, an image decoded at the reception side is displayed on a monitor 40 as needed.

The second-stage signal 105 encoded based on $\frac{1}{4}$ and $\frac{1}{8}$ images by the second encoder 24 is decoded by a second decoder 28 with reference to data stored in the fifth frame memory 31, and is stored in a sixth frame memory 32. This data is subjected to x 4 interpolation processing by a second interpolation device 36, and is stored in the video memory 39 upon switching of the selector 38.

Similarly, the third-stage signal 106 encoded based on $\frac{1}{2}$ and $\frac{1}{4}$ images by the third encoder 25 and the fourth-stage signal 107 encoded based on an original image and a $\frac{1}{2}$ image are respectively decoded by third and fourth decoders 29 and 30, seventh and eighth frame memories 33 and 34, and a third interpolation device 37, and are stored in the video memory 39. The stored data are displayed on the monitor 40.

The signal stored in the eighth frame memory 34 as a fourth-stage decoded image signal is output to a printer 41 to obtain a hard copy.

FIG. 3 shows filter coefficients of a 3×3 (pixel) low-pass filter used as the first, second, and third low-pass filters 11, 15, and 19 in the encoder shown in FIG. 1. The weighting coefficient of the central pixel is represented by C, a weighting coefficient of 2 is assigned to four pixels nearest to the central pixel, and a weighting coefficient of 1 is assigned to the next nearest pixels Thus, the value of the central pixel is represented by $D_{ij}$ (i=1 to M and j=1 to N: M and N are pixel sizes in the horizontal and vertical directions), an average density W is given by:

$$W = (D_{i-1,j-1} + 2D_{ij-1} + D_{i+1,j-1} + 2D_{i-1,j} + cD_{ij} + 2D_{i+1,j} + D_{i-1,j+1} + 2D_{ij+1} + D_{i+1,j+1})$$

Each of the first, second, and third comparators 12, 16, and 20 binary-encodes this value W with a threshold value T (standard setup value is T=(12+C)/2). The values W and T have the following correspondence.

$$\begin{cases} \text{If } W \geq T, \text{ output signal} = 1 \\ \text{If } W < T, \text{ output signal} = 0 \end{cases}$$

FIG. 4 is a block diagram of the low-pass filter and the comparator for performing the above-mentioned arithmetic operations. An input signal is latched by latches 44a, 44b, and 44c to be delayed by one pixel clock, respectively. Line memories 43-a and 43-b hold input signals delayed by one line. Signals having pixel positions corresponding to those of the latches 44a, 44b, and 44c are obtained at latches 44d, 44e, and 44f, and latches 44g, 44h, and 44i. Thus, data corresponding to nine pixels shown in FIG. 3 are obtained. The output signals from the latches 44a, 44c, 44g, and 44i are added by an adder 45a, and the sum data is multiplied with a constant (x 1) by a multiplier 46a.

The output signals from the latches 44b, 44d, 44f, and 44h are added by an adder 45b, and the sum data is multiplied with a constant (x 2) by a multiplier 46b. The output signal from the latch 44e as the central value is multiplied with a constant (xC) by a multiplier 46c. The value C can be set by the external controller 9, and its standard value is C=4.

The output signals from the multipliers 46a, 46b, and 46c are added by an adder 47, and the sum data is compared with the threshold value T by a comparator 48. When the sum data is larger than the threshold value T, a signal of "1" level is obtained; otherwise, a signal of "0" level is obtained. The threshold value T can also be set by the external controller 9, and has a value of T=(12+C)/2 as the standard value, as described above.

FIG. 5 is a view for explaining a sub-sampling operation in the encoder shown in FIG. 1. Hatched pixel data in FIG. 5 are sampled at every other timings in main and sub scan directions, thus forming a sub-sampled image having a $\frac{1}{2}$ size ($\frac{1}{4}$ in terms of an area). Such sub-sampling operation can be easily realized by adjusting latch timing of image data.

In this manner, before sub-sampling processing for obtaining a low-resolution image for progressive coding, original data is smoothed by the low-pass filter, and the smoothed data is binary-encoded. Thus, good low-resolution image data free from omission or error of an image can be obtained as compared with resolution reduction processing by simple sampling. Furthermore, since the smoothing parameters and the binary-encoding threshold value can be independently set in units of stages, sub-sampled images suitable for respective processing operations can be obtained, and the following encoding processing can be satisfactorily performed.

Encoding will be described below.

In this embodiment, encoding is performed using arithmetic coding, and a value of a pixel of interest is predicted on the basis of surrounding pixels. A symbol when prediction is successful is called a most probable symbol (1), a symbol when prediction is unsuccessful is called a less probable symbol (0), and a generation probability of the less probable symbol is represented by p. With this data, encoding is performed. For further details about arithmetic coding, please refer to "Image Signal Processing for FAX and OA", Takahiko FUKINUKI, Nikkan Kogyo, Co.

More specifically, if a binary arithmetic code for a code string s is represented by C(S) and its assist amount is represented by A(S), encoding progresses according to the following arithmetic operations:

$$\begin{aligned} A(S1) &= A(S) \cdot P(S) = A(S) \cdot 2^{-Q(S)} \\ A(S0) &= A(S) - A(S1) \\ C(S1) &= C(S) + A(S0) \\ (S0) &= C(S) \\ \text{for } A \text{ (null)} &= 0.11 \ldots 1 \end{aligned} \quad (1)$$

Assuming $p(S) = 2^{-Q(S)}$, multiplication is performed by only shifting a binary number. Q is called a skew value. The most probable symbol, the less probable symbol, the skew value Q, and the like are state-separated from values of reference pixels used for prediction, and are determined in advance based on a standard image.

In decoding, a binary signal string S is given by $S' \times S''$, and when decoding progresses up to S', C(S) and $C(S') + A(S'0)$ are compared. When $C(S) > C(S') + A(S'0)$, decoding is performed if x=1; otherwise, decoding is performed if X=0.

Figure 6:
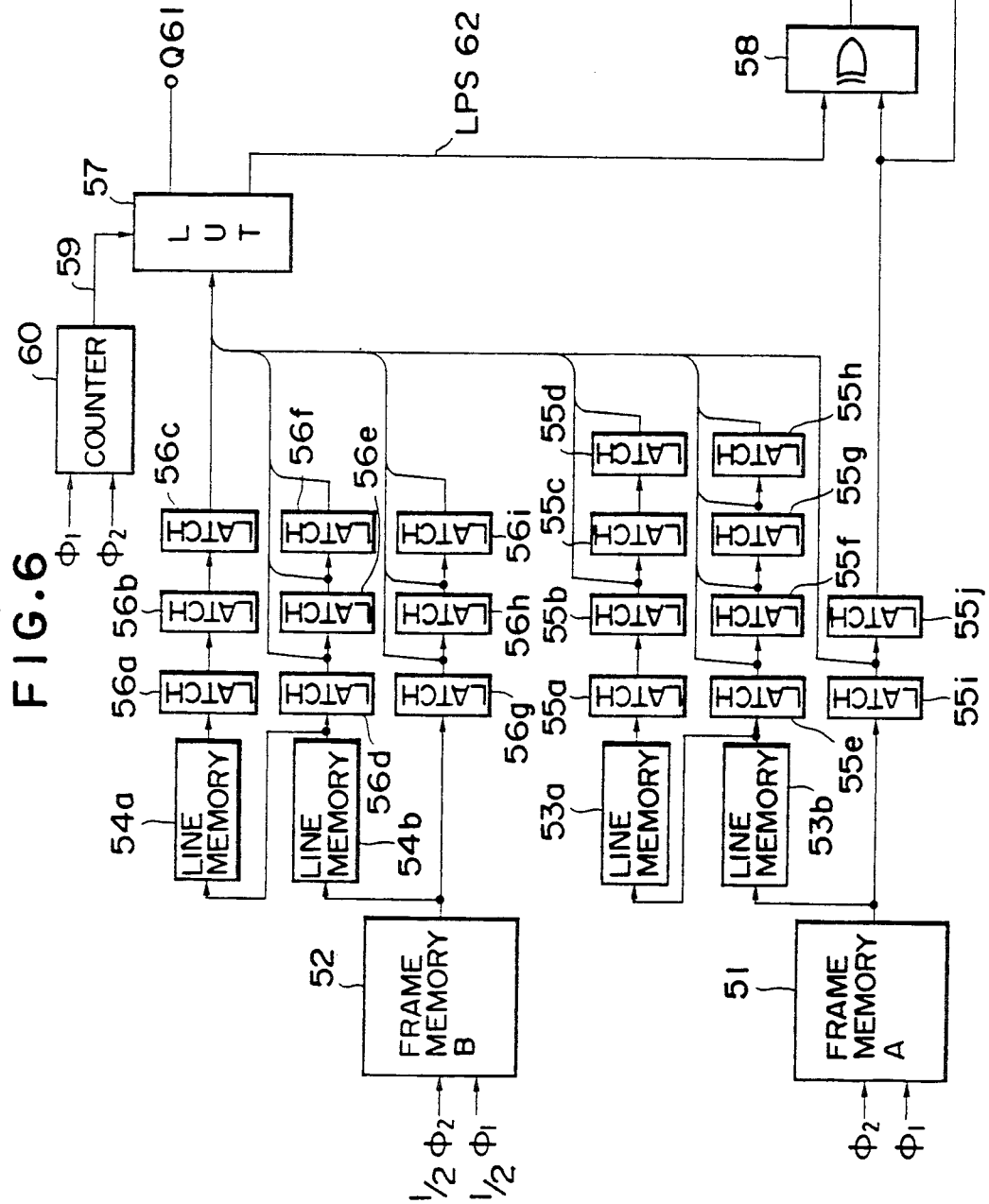
FIG. 6 is a block diagram of a prediction circuit.

FIG. 6 is a block diagram of a circuit portion for predicting a pixel of interest in the first, second, third and fourth encoders 23, 24, 25, and 26.

A frame memory A51 is a memory for storing at least one frame of image data to be encoded. A frame memory B52 stores at least one frame of image data which corresponds to an image sent one stage before and is sub-sampled to ½ of the image data stored in the frame memory A51. Each frame memory comprises a two-dimensional memory. If a clock for x addresses is represented by $\phi_1$ and a clock for y addresses is represented by $\phi_2$, the clocks $\phi_1$ and $\phi_2$ are input to the frame memory A51, and clocks $\frac{1}{2}\phi_1$ and $\frac{1}{2}\phi_2$ having a ½ frequency are input to the frame memory B52. Thus, one pixel of the frame memory B52 corresponds to 2×2, i.e., 4 pixels of the frame memory A51.

Figure 7:
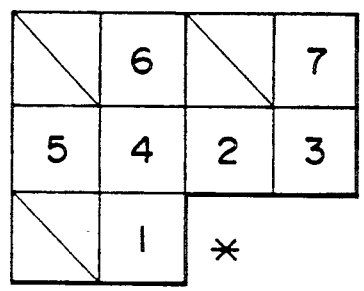
FIG. 7 id view for explaining reference pixels on an encoding surface.

Data read out from the frame memories A51 and B2 are delayed by one line in line memories 53a, 53b, 54a, and 54b, and are input to latches 55 and 56. These latches hold data delayed by one pixel. FIG. 7 shows the positions of reference pixels of image data read out from the frame memory A51. The outputs from the latches shown in FIG. 6 have the following correspondence with the pixel positions shown in FIG. 7. That is, a pixel of interest (*) corresponds to the output from a latch 55j (pixel of interest signal D301); a position No. 1 in FIG. 7, the output from a latch 55i; No. 2, a latch 55g; No. 3, a latch 55h; No. 4, a latch 55f; No. 5, a latch 55e; No. 6, a latch 55b; and No. 7, a latch 55d.

Figure 8:
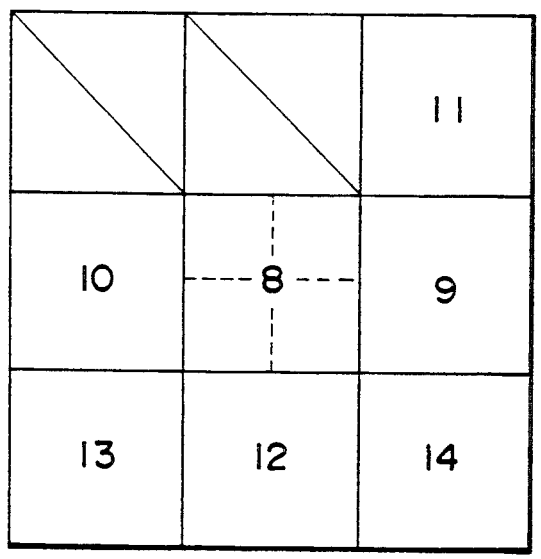
FIG. 8 is a view for explaining reference pixels of an image sent one stage before the current stage.

FIG. 8 shows the positions of reference pixels of image data read out from the frame memory B52. A pixel position No. 8 corresponds to the output from a latch 56e; No. 9, a latch 56c; No. 10, a latch 56d; No. 11, a latch 56c; No. 12, a latch 56h; No. 13, a latch 56g; and No. 14, a latch 56i.

An image at the position No. 8 in FIG. 8 is ½ image data corresponding to 2×2 pixels including a pixel of interest. A 2-bit pixel position signal 59 for identifying the position of the pixel of interest in No. 8 (four states, i.e., upper left, upper right, lower left, and lower right) is generated by a counter 60 on the basis of the clocks $\phi_1$ and $\phi_2$.

The pixel position signal 59 and pixel signals from the latches 55 and 56 are input to an LUT (look-up table) 57. The LUT 57 outputs a skew value Q61 and a less probable symbol (LPS) signal 62 in each state. The content of the LUT 57 can be calculated in advance with reference to a standard image or the like.

An EXOR gate 58 exclusively ORs the LPS signal 62 from the LUT 57 and the pixel of interest signal D301 from the latch 55j, thus obtaining an MPS/$\overline{\text{LPS}}$ signal 63. When the signal MPS/$\overline{\text{LPS}}$ signal is "1", the pixel of interest corresponds to the most probable symbol; when it is "0", the pixel corresponds to the less probable symbol.

The first encoder 23 for first-stage encoding does not refer to the content of the frame memory B52, and refers to only pixel data from the frame memory A51. Therefore, the line memories 54, the latches 56, and the counter 60 associated with the frame memory B52 are omitted.

Figure 9:
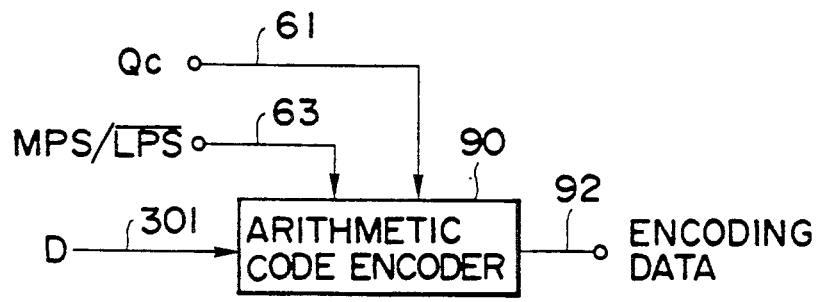
FIG. 9 is a block diagram of an arithmetic code encoder.

FIG. 9 is a block diagram of an arithmetic code encoder. The signal Q61 and the MPS/$\overline{\text{LPS}}$ signal 63 shown in FIG. 6 are input to the arithmetic code encoder, so that arithmetic operations represented by equations (1) are performed for the pixel of interest data D301 by an encoder 90, thus obtaining encoding data 92.

Figure 10:
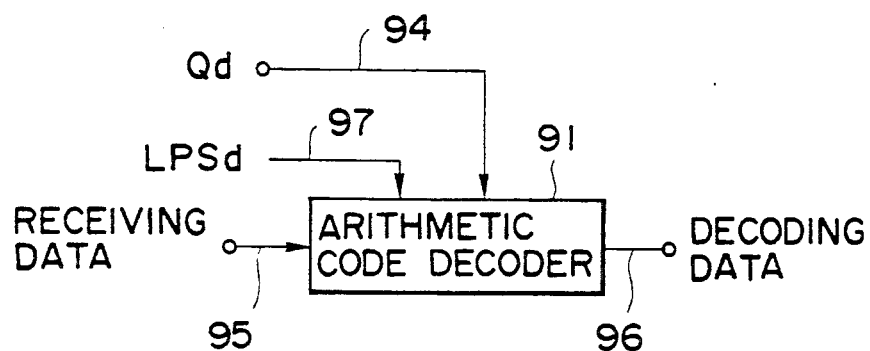
FIG. 10 is a block diagram of an arithmetic code decoder.

FIG. 10 is a block diagram of the first, second, third, and fourth decoders 27, 28, 29, and 30 in FIG. 2. A decoding side also includes a prediction circuit similar to that in the encoder. A decoder 91 performs decoding arithmetic operations on the basis of a skew value Qd 94 of the decoder, a less probable symbol LPSd 97 from the LUT, and receiving data 95, thus obtaining decoding data 96.

Figure 11:
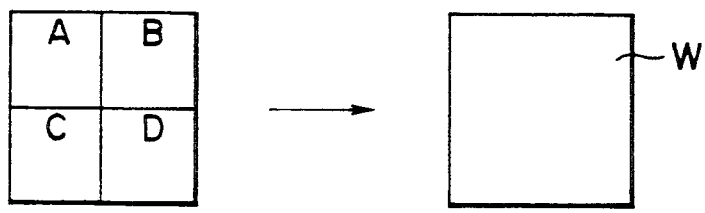
FIG. 11 is a block diagram of another embodiment for adjusting a smoothing effect.

In the above embodiment, the degree of smoothness is adjusted in accordance with the weighting coefficient of the central value of the coefficients of the 3×3 low-pass filter. As another embodiment of sub-sampling, as shown in FIG. 11, when conversion data W is determined on the basis of original image data $D_A$, $D_B$, $D_C$, and $D_D$, W is given by:

$$W = \alpha_1 D_A + \alpha_2 D_B + \alpha_2 D_C + \alpha_2 D_D$$

In this case, coefficients $\alpha_1$ and $\alpha_2$ can be changed to adjust the degree of smoothness and coding efficiency.

In this case, $$T = \frac{\alpha_1 + 3\alpha_2}{2}$$

If $W \geq T$, output signal = 1
If $W < T$, output signal = 0

When $\alpha_1 \gg \alpha_2$, a ratio of determination based on $D_A$ is increased, and coding efficient is improved.
When $\alpha_1 = \alpha_2$, a smoothing effect for an image is improved.

As described above, when images having progressively different resolutions are to be encoded, the degree of smoothness and a binary-encoding threshold value for an image before resolution conversion are adjusted. Therefore, quality and coding efficiency of an image to be transmitted in a first stage can be arbitrarily selected.

The preferred embodiment of the present invention has been described. However, the present invention is not limited to this, and various changes and modifications may be made within the spirit and scope of the invention.

What is claimed is:

1. An image progressive encoding apparatus comprising:
   input means for inputting a first binary image data representing an image having a first resolution;
   generating means for generating a second binary image data representing an image having a second resolution lower than the first resolution on the basis of the first binary image data; and
   encoding means for encoding the first and second binary image data, respectively,
   wherein said generating means includes:
   low-pass filter means for performing low-pass filter processing on the first binary image data corresponding to a pixel of interest and surrounding pixels in accordance with a parameter;
   compare means for comparing image data obtained by the low-pass filter processing with a threshold value to form the second binary image data; and
   supplying means for supplying the parameter to said low-pass filter means and the threshold value to said compare means, respectively,
   wherein the threshold value to be supplied to said compare means changes in accordance with a change of the parameter of said low-pass filter means.

2. An apparatus according to claim 1, wherein said low-pass filter means performs an arithmetic operation on the first binary image data in accordance with filter coefficients.

3. An apparatus according to claim 1, wherein said generating means further comprises sub-sampling means for sub-sampling image data obtained by the comparing operation of said compare means.

4. An apparatus according to claim 1, wherein said encoding means encodes the first and second binary image data using arithmetic coding.

5. An apparatus according to claim 1, wherein the second resolution is half of the first resolution.

6. An image progressive encoding method comprising:
   a first step of performing low-pass filter processing on a first binary image data representing an image having a first resolution in accordance with a first parameter;
   a second step of comparing image data obtained by the low-pass filter processing of said first step with a first threshold value;
   a third step of sub-sampling image data obtained by the comparing operation of said second step to form a second binary image data representing an image having a second resolution lower than the first resolution;
   a fourth step of performing low-pass filter processing on the second binary image data formed by said third step in accordance with a second parameter;
   a fifth step of comparing image data obtained by the low-pass filter processing of said fourth step with a second threshold value;
   a sixth step of sub-sampling image data obtained by the comparing operation of said fifth step to form a third binary image data representing an image having a third resolution lower than the second resolution; and
   a seventh step of encoding the first, second and third binary image data, respectively,
   wherein the first and second parameters are independently set, and the first and second threshold values are independently set.

7. A method according to claim 6, wherein in said first and fourth steps, the low-pass filter processing is performed for image data corresponding to a pixel of interest and surrounding pixels.

8. A method according to claim 6, further comprising a supplying step of supplying the first and second parameters and the first and second threshold values.

9. A method according to claim 6 wherein the first and second threshold values change in accordance with the changes of the first and second parameters, respectively.

10. A method according to claim 6, wherein in said seventh step, the first, second and third binary image data are encoded using arithmetic coding.

11. A method according to claim 6, wherein the second resolution is half of the first resolution, and the third resolution is half of the second resolution.

* * * * *

UNITED STATES PATENT AND TRADEMARK OFFICE
CERTIFICATE OF CORRECTION

PATENT NO. : 5,124,811
DATED : June 23, 1992
INVENTOR(S) : HIDEFUMI OHSAWA, ET AL.

Page 1 of 2

It is certified that error appears in the above-identified patent and that said Letters Patent is hereby corrected as shown below:

Title page:
IN [75] INVENTORS

"Masashino" should read --Musashino--.

SHEET 1 OF 6

FIG. 1, "LOWPASS" (both occurrences) should read --LOW-PASS--.

SHEET 2 OF 6

FIG. 2, "MONITER" should read --MONITOR--.

COLUMN 2

Line 8, "id view" should read --is a view--.

COLUMN 3

Line 17, "decoded" should read --is decoded--.

COLUMN 4

Line 37, "timings" should read --timing--.
Line 38, "sub scan" should read --sub-scan--.

COLUMN 5

Line 23, "X = 0" should read --x = 0--.
Line 40, "B2" should read --B52--.

UNITED STATES PATENT AND TRADEMARK OFFICE
CERTIFICATE OF CORRECTION

PATENT NO. : 5,124,811

DATED : June 23, 1992

INVENTOR(S) : HIDEFUMI OHSAWA, ET AL.

Page 2 of 2

It is certified that error appears in the above-identified patent and that said Letters Patent is hereby corrected as shown below:

Column 8:

<u>CLAIM 9</u>

Line 34, "claim 6" should read --claim 6,--.

Signed and Sealed this

Seventeenth Day of August, 1993

Attest:

BRUCE LEHMAN

Attesting Officer

Commissioner of Patents and Trademarks